United States Patent Office 2,818,453
Patented Dec. 31, 1957

2,818,453

SELECTIVE SOLVENT EXTRACTION PROCESS EMPLOYING NITRO DIETHYL COMPOUNDS AS SOLVENTS

Joseph A. Chenicek, Bensenville, Ill., assignor to Universal Oil Products Company, Des Plaines, Ill., a corporation of Delaware No Drawing. Application July 1, 1954
Serial No. 440,841

9 Claims. (Cl. 260—674)

This invention relates to a process for separating mixtures of organic compounds utilizing a solvent in which one or more of the components of the mixture is selectively soluble. The invention is particularly directed to the separation of unsaturated hydrocarbons from admixtures with saturated hydrocarbons in a liquid-liquid extraction process utilizing a $\beta$-nitro-substituted diethyl ether, thio-ether, or amine as the selective solvent in the process.

In one of its embodiments the present invention concerns a solvent extraction process for separating a mixture of organic compounds which vary in their degree of solubility in a solvent contacted therewith, which comprises contacting said mixture with said solvent at conditions sufficient to maintain at least the solvent in substantially liquid phase, said solvent comprising a predominant proportion of a compound having the structure designated by the formula:

$$O_2N\text{---}CR_2\text{---}CR_2\text{---}X\text{---}CR_2CR_2\text{---}Z$$

wherein each R is selected from the group consisting of hydrogen and a lower alkyl group, X is a divalent radical selected from the group consisting of oxy, thio, and imino, and Z is selected from nitro, hydroxyl, amino and cyano.

A more specific embodiment of the invention concerns a process for recovering an aromatic hydrocarbon from a hydrocarbon mixture of the same with saturated hydrocarbons which comprises contacting said mixture with a solvent comprising di-($\beta$-nitroethyl)-amine, segregating a fat solvent stream comprising said solvent containing dissolved aromatic hydrocarbon from a raffinate stream consisting substantially of saturated hydrocarbons present in said mixture and treating said fat solvent stream to separate said aromatic hydrocarbon from the solvent.

The present invention is primarily concerned with the use of a specific class of compounds as solvents for the extraction and recovery of the polar and/or unsaturated components of a mixture of organic compounds comprising said polar or unsaturated components. The class of compounds from which the principal component of the present selective solvent or extractant composition is selected is characterized as the $\beta$-nitro-substituted diethyl ethers, diethyl thio-ethers and diethylamines; that is, diethyl compounds having one or both of the $\beta$, or $\beta'$-positions on the ethyl radicals substituted by a nitro radical, and, further, containing an oxy-ether, thio-ether or imino group linking the diethyl radicals. It has been found that nitro-substitution in the $\beta$-position of a diethylamine, diethyl ether or a diethylsulfide results in a general improvement in the solvency and selectivity characteristics of the above diethyl compounds, the latter, in general, having properties which make them particularly suitable as selective solvents for the separation of mixtures of organic compounds into their constituent classes. The introduction of at least one $\beta$-nitro substituent into such compounds also enhances their desirable physical and chemical properties for solvent extraction purposes. These compounds, which constitute the primary solvent component of the present solvent composition, have the following essential empirical structure:

$$O_2N\text{---}CR_2CR_2\text{---}X\text{---}CR_2CR_2\text{---}Z$$

wherein Z is selected from nitro, amino, hydroxyl and cyano, X is selected from the group consisting of the divalent oxy, thio and imino radicals and each R is selected from hydrogen and a lower alkyl group such as methyl. Typical specific compounds within the generic class represented by the above empirical structure include such compounds as $\beta$, $\beta'$-dinitrodiethylamine, $\beta$, $\beta'$-dinitrodiethyl sulfide, $\beta$, $\beta'$-dinitrodiethyl ether, $\beta$-nitro-$\beta'$-cyano-diethylamine, $\beta$-nitro-$\beta'$-cyano-diethyl sulfide, $\beta$-nitro-$\beta'$-cyano-diethyl ether and the mono- and poly-, $\alpha$, $\alpha'$, $\beta$, $\beta'$-methyl derivatives of the above, such as $\beta$, $\beta'$-dinitrodiisopropylamine. It is to be particularly noted that both of the $\beta$ and $\beta'$ positions in such diethyl compounds may be substituted by mono-nitro, or alternatively one of such substituents may be cyano, amino, or hydroxyl and the other nitro, as desired. These compounds may be used individually as the sole component of the present liquid solvent composition or may be used in admixture with other members of the above group of compounds or with other types of solvents in mixtures containing a predominant proportion of one of the compounds of the above type. Thus, the above types of compounds may be mixed with water or another organic solvent such as diethylene glycol and the resulting solution utilized in the present extraction process as the present selective solvent composition, provided that a predominant proportion of the mixture consists of one of the above $\beta$-nitro-substituted diethyl derivatives.

Other classes of solvents useful in admixture with the above-specified primary component of the solvent composition are the alcohols, esters, ketones and nitriles, including for example, alcohols, such as the long-chain monohydric alcohols, including, hexanol, cyclohexanol, heptanol, octanol, undecanol, decanol and their homologs and isomers; the glycols such as trimethylene glycol, ethylene glycol, diethylene glycol, tri-ethylene glycol, tetraethylene glycol, propylene glycol, dipropylene glycol, tripropylene glycol, the mixed ethylene and propylene glycols; the polyethylene and polypropylene glycol alkyl ethers, such as the mono- and dimethyl and the mono- and diethyl ethers of the $\gamma$ and $\gamma'$-hydroxyl groups of such mono- and polyethylene and mono- and polypropylene glycols; the simple, low molecular weight organic acid esters of the above mono- and polyethylene and mono- and polypropylene glycols, such as, the formates, acetates, and propionates; the $\beta$- and $\beta,\beta'$-mono- and di-amino, mono- and di-cyano-, and the mono- and di-hydroxy-diethyl amines, sulfides, and ethers. The preferred secondary solvent utilizable in admixture with the primary solvent component depends upon the particular mixture of organic compounds to be subjected to the present extraction process, its boiling point requirements and its selectivity or solvency.

One of the principal uses for the present solvent extraction process is for the recovery of unsaturated hydrocarbons (including compounds having aromatic unsaturation) from their more saturated analogs. For this purpose, one of the preferred secondary solvents employed as a solution in minor amounts with the primary solvent component, that is, with the $\beta$-nitro-substituted diethyl ethers, sulfides and amines herein provided, is water, which modifies the solvency characteristics of the primary solvent component to make the latter more selective for the more highly unsaturated component or components of the hydrocarbon mixture. When utilizing such mixtures of secondary and primary solvent components in the extraction, suitable ratios of secondary to primary solvent components in the present selective solvent composition are from about 1 to 20 to about 1 to 2, providing composition containing from 0.5 to about 35% of the secondary solvent component, although the lower ratios within the above range, preferably from about 0.5 to about 20% are generally preferred and are especially suitable when water is selected as the secondary solvent constituent.

As referred to herein, the charge stock, specified as a mixture of organic compounds separable by means of the present extraction procedure utilizing the present selective solvent is a mixture of several organic compounds or classes of compounds, each of the components or class of compounds being soluble in the solvent to a different degree, while the charge stock mixture as a whole is incompletely soluble in the solvent. In general, the selective solvent compositions provided in this invention have a greater solvency for unsaturated compounds in which the unsaturation is either of the aromatic type or of the mono- or polyolefinic doubly bonded carbon atom type. Thus, the present selective solvent tends to preferentially dissolve aromatic hydrocarbons from hydrocarbon mixtures containing aromatic and olefinic or paraffinic hydrocarbons and preferentially extracts diolefins from mixtures of mono-olefins and paraffins, particularly when the diolefin is a cyclic diene such as cyclohexadiene. The present process may also be utilized to selectively remove mono-olefins or cycloparaffins (naphthenes) from admixture with paraffins, the selectivity of the solvent for the foregoing hydrocarbon types decreasing in the following order: aromatic (mono- and bicyclic), cyclo-olefinic, naphthenic (i. e., cycloparaffinic), aliphatic polyolefinic, aliphatic mono-olefinic, and paraffinic. The selectivity of the solvent for mono-olefins compared to paraffins may be enhanced by increasing the proportion of the secondary solvent, such as water, in the solvent composition; furthermore by such means, the purity of the final extract in the desired class of compounds to be recovered may also be enhanced. Other mixtures of organic compounds which may be extracted in accordance with the present process to recover a particular component or class of compounds from the charging stock include mixtures of organic compounds in which one component or class of compounds contains a polar substituent in its molecular structure and the other compound or class of compounds in the mixture is less polar. Thus, for example, compounds containing an hydroxyl group, a carboxyl group, a sulfhydryl radical, or a cyano group may be recovered from hydrocarbons generally or from compounds which may also contain one or more polar substituents but in which the hydrocarbon portion of the compound has a predominant effect, making the compound less polar than the extractable polar components. Illustrative of such mixtures of organic compounds are, for example, predominantly hydrocarbon mixtures containing small amounts of phenols, thiophenols or organic nitrogen compounds, a mixture of a long chain alcohol and a lower aliphatic acid, such as a fatty acid, or a mixture of a fatty acid ester of a short chain alcohol such as a mixture of a fatty acid glyceride and amyl alcohol, for example.

The present solvent extraction process is preferably effected at temperatures and pressures suitable to maintain at least the solvent composition and preferably both the solvent and feed stock in substantially liquid phase, such that liquid-liquid countercurrent contact may be established between the charging stock undergoing extraction and the solvent composition which acts as the extractant. Since the solubility of the compound or class of compounds selectively extracted from the charging stock increases substantially as the temperature of the extraction increases, it may be desirable to operate the extraction process at temperatures above the boiling point of either the charging stock or solvent composition, particularly when these have boiling points below the desired temperature of extraction, employing sufficiently superatmospheric pressures in the extractor to maintain the system in substantially liquid phase condition. Temperatures of from about 20° to about 250° C., and pressures from atmospheric to 100 atmospheres are usually sufficient for this purpose, depending upon other conditions and other factors present in the process. In the case of solvent compositions containing a relatively large proportion of secondary solvent, which increases the selectivity of the solvent for the particular component of the organic mixture to be extracted, but which reduces the solubility of the latter, in the solvent composition, it becomes desirable to maintain a high solvent to feed stock ratio in order to effect the extraction at a reasonable rate. In some instances, particularly when the objective of the process is the recovery of a highly purified extract utilizing a solvent composition which is highly selective for the extractable component, the solvent to feed stock ratio may be as high as 30 volume proportions of solvent per volume of feed stock. In other instances, for example, when the solvent composition has a naturally high selectivity and a high degree of solvency for the component to be recovered, relatively low solvent circulation rates may be utilized with a corresponding decrease in the solvent to feed stock ratio employed in the process. Thus, in the recovery of an aromatic hydrocarbon such as benzene from a mixture of aromatic and paraffinic hydrocarbons, the presently provided selective solvent compositions, even in the absence of a substantial proportion of secondary solvent in the composition, the circulation rate of solvent may be as low as one volume of solvent per volume of feed stock. In any particular instance, however, since the solvency, selectivity and the desired purity of the recovered product are mutually dependent factors, the selection of the solvent circulation rate, the temperature, the ratio of secondary to primary solvent in the composition and the number of contacting stages required in the system must be specifically determined for the particular system by trial methods.

As heretofore noted, the present solvent extraction process is preferably effected under countercurrent contacting conditions in which the denser of the two fluids (that is, the solvent composition and feed stock fluids) is introduced into the upper portion of the extraction zone and allowed to flow downwardly through a rising stream of the fluid having the lowest specific gravity usually the feed stock mixture. In certain instances, extractive distillation may be the preferred method for effecting the present separation, for example, by introducing the feed stock as a vapor stream into the extraction zone containing the solvent composition in liquid phase, the extraction zone being maintained at a sufficient temperature to maintain the feed stock in vaporized condition. Any suitable form of contacting apparatus may be employed, such as a column containing perforated partitions, columns packed with solid contacting material such as Berl saddles, quartz chips, charcoal particles etc. or a column containing bubble plates and riser of conventional design and fabrication.

In the preferred countercurrent method of solvent extraction, herein provided, the denser of the two phases formed in the liquid-liquid or vapor-liquid contacting zone is removed from the lower portion of the zone and additionally treated, if desired, to recover the undissolved components of the feed stock mixture, as the raffinate, or the extracted components of the feed stock mixture, as the extract. In general, the phase of greatest specific gravity in the present extraction process is usually the fat solvent containing one or more dissolved or extracted components of the feed stock mixture, since most solvents are generally of relatively high specific gravity compared to the majority of organic components which may be subjected to extraction in accordance with the present process. When the objective of the present extraction is the recovery of the relatively more unsaturated component of the feed stock mixture, the extract phase may be separately treated following the contacting stage to segregate the extracted or dissolved component therefrom. Any suitable manner of separating the extracted component from the extract phase may be employed which will result in the formation of another phase separable from the solvent. Thus, the extracted component may be vaporized from the extract phase, may be salted out or may be precipitated therefrom by the addition of an antisolvent, such as water, to the fat solvent phase. One of the preferred methods for the recovery of the extracted component comprises heating the fat solvent to the vaporization temperature of the dissolved extracted component, while retaining the solvent in substantially its liquid phase condition, for example, by the method referred to in the art as "stripping" or distillation. For this purpose, the extract phase is heated to a temperature sufficient to vaporize the extracted component and may be accompanied by injection of steam or other inert vapor into the heated fat solvent which depresses the boiling point of the extracted component during the heating operation to thereby form an azeotrope or a mixed vapor stream having a lower boiling point than the fat solvent phase. Such procedures are well-known expedients in the art for the recovery of extracted components from the fat solvent formed in the solvent extraction process and an application of such procedure to the present process in the use of the present selective solvent composition is not unlike the usual practice in this respect.

The present invention is further illustrated with respect to several of its specific embodiments in the following examples, which, however, are not intended to unduly restrict the invention in accordance therewith.

EXAMPLE I

Several feed stock mixtures, prepared by mixing the individual components in the proportions indicated in the following Table I:

*Table I*

| Feed stock mixture | Composition of mixture in wt. percent |
|---|---|
| A | 10 benzene. 90 cyclohexane. |
| B | 10 benzene. 40 n-hexane. 50 cyclopentane. |
| C | 30 n-pentene. 70 n-pentane |
| D | 5 phenol. 95 n-hexane. |
| E | 2 thiophene. 98 cyclohexane. |
| F | 13 cyclohhexane. 87 cyclohexane. | are shaken with a solvent composition consisting of $\beta,\beta'$-dinitrodiethyl ether containing 3% by weight of water in order to determine the distribution of components comprising the feed stock mixture in the fat solvent and raffinate phases, thereby providing a means of determining the solvency and selectivity of the solvent composition for the extractable component of the feed stock. The feed mixtures are extracted in a batch-type liquid-liquid contacting procedure by placing 20 volume percent of the feed mixture and 80 volume percent of the solvent (based on the total volume of combined feed and solvent) in a flask, shaking the resulting mixture at 40° C. for 10 minutes, permitting the mixture to settle and to separate into two distinct phases and analyzing each phase after decantation for its composition. The solvency factor is determined as the volume percentage of dissolved feed stock (i. e. both raffinate and extract components in the solvent) to total volume of feed stock present in the extraction zone, while the selectivity factor for the solvent composition is determined in accordance with the following ratio:

$$\text{Selectivity} = \frac{\text{Volume of unsaturated hydrocarbon or polar compound (extract) in fat solvent}}{\text{Volume of raffinate in fat solvent}}$$

The values thus determined for selectivity and solubility for each of the above mixtures is given in the following table:

*Table*

| Feed stock mixtures | Selectivity | Solubility, percent [1] |
|---|---|---|
| A | 10.5 | 12 |
| B | 3.5 | 14 |
| C | 8.6 | 28 |
| D | 18.3 | 6 |
| E | 12.4 | 3 |
| F | 2.5 | 18 |

[1] The fat solvent phase in each case is not necessarily saturated with solute because of the constant volume of total feed mixture and solvent utilized in each run and the varying quantity of soluble component charged to the extraction zone.

The above indicates that the solvent is more selective for the polar and unsaturated components of the feed stock and that even though the solvent extracts such components substantially completely from the feed stock, producing a fat solvent relatively unsaturated with respect to solute, the raffinate component of the feed mixture remains essentially insoluble in the solvent.

A solvent composition consisting of a 3% aqueous solution of $\beta$-nitro-diethylamine utilized in a similar series of extractions yielded results of substantially the same order of values for the solvency and selectivity factors, as for the $\beta,\beta'$-dinitrodiethyl ether solvent.

EXAMPLE II

A feed stock mixture obtained by fractionally distilling a 400° F. end-point hydroformed gasoline product and recovering a fraction thereof having an end point of 110° C. and the following PONA analysis:

|   | Percent |
|---|---|
| Paraffins | 76 |
| Olefins | 1 |
| Naphthenes | 8 |
| Aromatics | 15 | is utilized as feed stock in a countercurrent extraction process employing a solvent consisting of a 7.5% aqueous solution of $\beta,\beta'$-dinitrodiisopropyl ether. The solvent is run into the top of a packed column (Berl saddles packing) while the feed stock is fed into the column immediately above the outlet for the fat solvent phase in the bottom of the column, the ratio of solvent to feed mixture charged to the extraction zone being maintained at about 8.5 to 1 volumes per volume. The raffinate stream removed from the top of the packed column consisted only of saturated paraffinic and naphthenic hydrocarbons, while the fat solvent stream removed from the bottom of the column contained substantially all of the aromatics present in the feed stock. The fat solvent stream when subjected to steam distillation in a separate distilling column yields an overhead mixture of water and aromatic hydrocarbons which can be separated into an aromatic product and a waste water condensate by simple decantation of the hydrocarbons from the water. Fractional redistillation of the aromatic product yields a benzene fraction which is 99+% pure, a toluene fraction and a xylene fraction, all of which are substantially free of contaminating non-aromatic hydrocarbons.

I claim as my invention:

1. A solvent extraction process for separating a mixture of organic compounds which vary in their degree of solubility in a solvent contacted therewith, which comprises contacting said mixture with a liquid solvent comprising a predominant proportion of a compound selected from the group consisting of β,β'-dinitro-diethyl ether, β,β'-dinitro-diethyl sulfide and β,β'-dinitro-diethylamine.

2. The process of claim 1 further characterized in that said solvent contains a predominant proportion of β,β'-dinitro-diethylamine.

3. A process for separating an aromatic hydrocarbon from a hydrocarbon mixture containing the same which comprises contacting said mixture with a liquid solvent comprising a predominant proportion of a compound selected from the group consisting of β,β'-dinitro-diethyl ether, β,β'-dinitro-diethyl sulfide and β,β'-dinitro-diethylamine.

4. The process of claim 3 further characterized in that said aromatic hydrocarbon is selected from the group consisting of benzene, toluene and xylene.

5. A solvent extraction process for separating a mixture of organic compounds which vary in their degree of solubility in a solvent contacted therewith, which comprises contacting said mixture with said solvent at conditions sufficient to maintain at least the solvent in substantially liquid phase, said solvent comprising a predominant proportion of β,β'-dinitrodiethyl ether.

6. The process of claim 5 further characterized in that said mixture of organic compounds is a hydrocarbon mixture in which the components are of varying degrees of unsaturation.

7. The process of claim 5 further characterized in that said mixture contains a compound bearing a polar substituent.

8. The process of claim 5 further characterized in that said solvent composition contains a secondary solvent which modifies selectivity of said diethyl compound.

9. The process of claim 8 further characterized in that said secondary solvent consists of water present in said solvent composition in an amount of from about 0.5 to about 35% by weight of said composition.

References Cited in the file of this patent

UNITED STATES PATENTS

| | | |
|---|---|---|
| 2,433,751 | Friedman | Dec. 20, 1947 |
| 2,495,852 | Lien et al. | Jan. 31, 1950 |

OTHER REFERENCES

Metcalf et al.: Petroleum Refiner, vol. 30, No. 7, July 1951, pages 97–100.